United States Patent [19]

Ballard

[11] Patent Number: 4,538,508

[45] Date of Patent: Sep. 3, 1985

[54] ROOF VENTILATOR HAVING FLUID FLOW CONTROL AND METHOD OF MAKING SAME

[75] Inventor: James W. Ballard, Livonia, Mich.

[73] Assignee: Jimco Products, Livonia, Mich.

[21] Appl. No.: 575,827

[22] Filed: Feb. 1, 1984

Related U.S. Application Data

[60] Continuation-in-part of Ser. No. 402,020, Jul. 23, 1982, , which is a continuation-in-part of Ser. No. 172,414, Jul. 25, 1980, Pat. No. 4,370,876, which is a division of Ser. No. 968,192, Dec. 11, 1978, Pat. No. 4,214,513, and a continuation-in-part of Ser. No. 193,711, Oct., 1980, Pat. No. Re. 31,549.

[51] Int. Cl.³ .............................................. F24F 7/00
[52] U.S. Cl. ...................................... 98/42.17; 98/119; 137/852; 137/854
[58] Field of Search ............ 98/29, 42 R, 43 R, 43 A, 98/43 C, 66 R, 116, 119, 122; 137/852, 854

[56] References Cited

U.S. PATENT DOCUMENTS

| | | | |
|---|---|---|---|
| 2,833,229 | 5/1958 | Donegan | 98/29 X |
| 3,228,418 | 1/1966 | Rosback et al. | 137/854 X |
| 3,472,150 | 10/1969 | Strawsine | 137/854 X |
| 4,432,273 | 2/1984 | Devitt | 98/43 A |

FOREIGN PATENT DOCUMENTS

| | | | |
|---|---|---|---|
| 881850 | 9/1971 | Canada | 98/122 |
| 3023928 | 1/1982 | Fed. Rep. of Germany | 137/854 |

Primary Examiner—Harold Joyce
Attorney, Agent, or Firm—Cullen, Sloman, Cantor, Grauer, Scott & Rutherford

[57] ABSTRACT

A ventilator device for allowing escape of air from enclosed spaces such as a building includes a unitary housing provided with an insert for controlling the flow of fluid therethrough. The insert comprises a pair of insulative, tubular sleeves between which there is sandwiched a flow control valve. The valve may include a fabric-like foraminous membrane which permits passage of moisture laden air outwardly through the ventilator but prevents moisture in the form of liquid or droplets from returning into the building through the ventilator. Alternatively, the valve may comprise a flexible member which deflects in response to a pressure differential within the housing to allow rapid escape of air from the roof to the surrounding environment.

24 Claims, 9 Drawing Figures

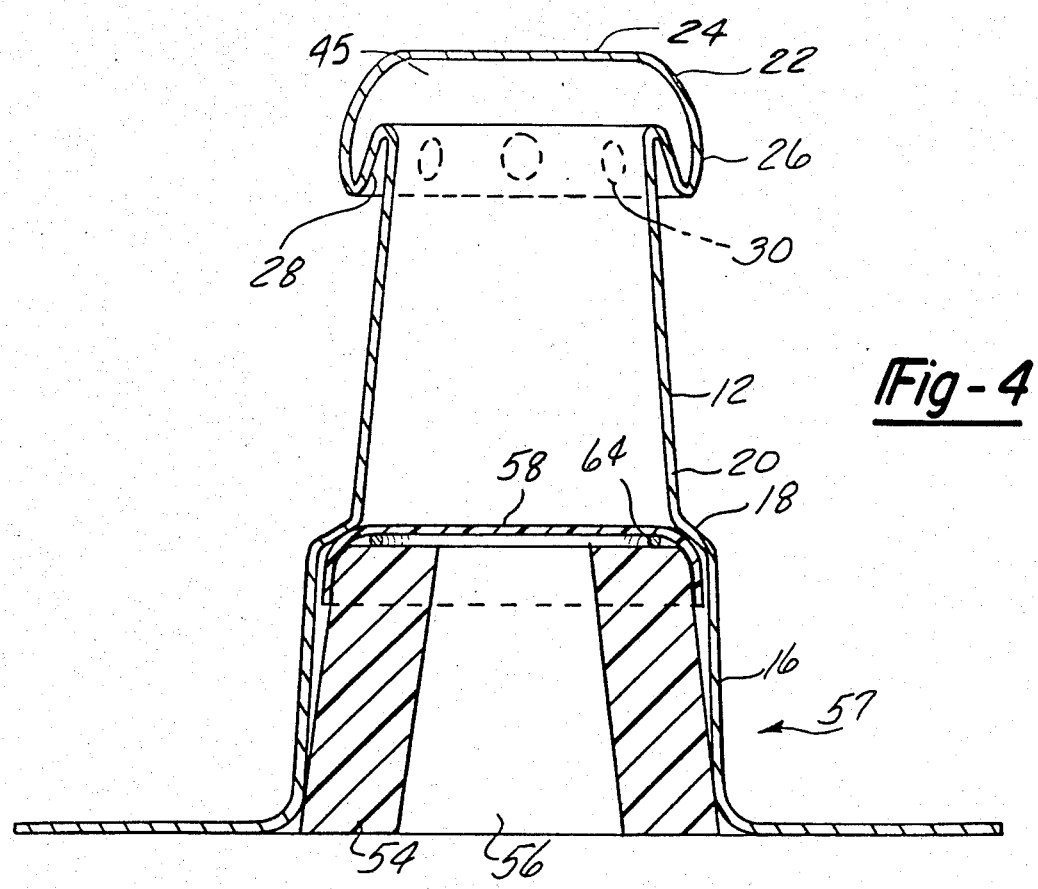
Fig-4
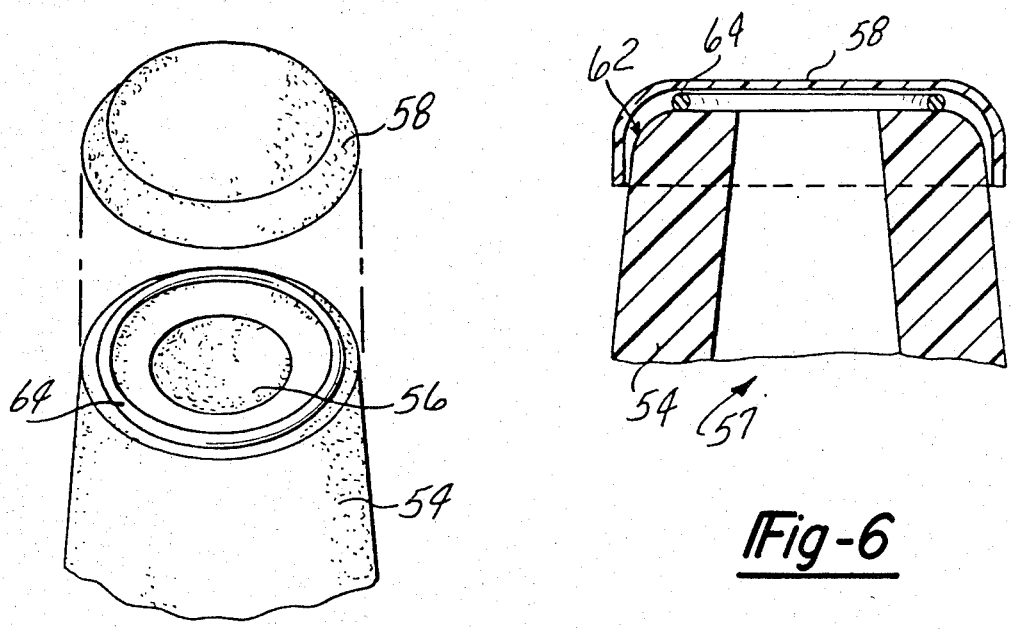
Fig-5
Fig-6

ROOF VENTILATOR HAVING FLUID FLOW CONTROL AND METHOD OF MAKING SAME

DESCRIPTION

RELATED APPLICATIONS

This application is a continuation-in-part of U.S. Ser. No. 402,020 filed July 23, 1982 which is a continuation-in-part of U.S. Ser. No. 172,414, filed July 25, 1980 now U.S. Pat. No. 4,370,876 which is a divisional of U.S. Ser. No. 968,192, filed Dec. 11, 1978 now U.S. Pat. No. 4,214,513, issued July 27, 1980, and is also a continuation-in-part of U.S. Ser. No. 193,711, filed Oct. 3, 1980 now U.S. Pat. No. Re. 31,549 which is a reissue of U.S. Pat. No. 4,241,513, the entire disclosures of which are incorporated herein by reference.

TECHNICAL FIELD

The present invention generally relates to a roof ventilator device and a method of fabricating the same, and deals more particularly with a ventilator adapted to allow unidirectional flow of fluid from within a roof on which the device is mounted and the surrounding exterior atmosphere.

BACKGROUND ART

Ventilation devices adapted to be installed in a roof of a building are well known in the art. One variety of these devices is particularly important in cool weather when the interior temperature of the building is warm and the ambient outside temperature is cool. Under these conditions, moisture in the ambient atmosphere tends to condense on top of the roof. Moisture build-up on the roof not only results in degradation of the roof structure but also tends to have a deleterious effect on materials or apparatus stored beneath the roof. Ventilation devices are also employed to prevent accumulation of moisture in insulation beneath the roof since moisture laden insulation drastically reduces insulation efficiency. Ventilation devices are therefore commonly employed to provide an outlet for moisture through the roof.

Ventilation devices of the type described above are commonly constructed of metal materials, especially aluminum which are well suited to withstand exposure to the elements without rusting, discoloration, etc. The portions of metal ventilators that project outwardly beyond the roof are apt to be considerably cooler than the air in the interior space of the enclosure. As a result, when the moisture laden air contacts the inside surfaces of the vent, it immediately starts to cool thereby resulting in moisture which is condensed and collects from the interior surfaces of the ventilator. This phenomena reduces venting efficiency and in many cases the amount of moisture that may collect is sufficient to run downwardly back into the building.

U.S. Pat. No. 4,214,513 issued to James Ballard on July 29, 1980 discloses a ventilator device well adapted for use with the present invention. The ventilator shown in the Ballard patent includes a flat, annular base adapted to be attached to the roof and an upwardly extending tubular portion having a cap which prevents the introduction of rain or the like directly through the vent into the building. With a vent of this type, particularly during the colder seasons of the year in northern climates, there is a considerable difference in the temperature surrounding the exterior portion of the vent compared to the temperature of the air in the building. As a result, the moisture within the building, in the form of water vapor, is quickly cooled when it strikes the sidewalls of the cylindrical portion of the ventilator whose exterior surface is surrounded by the ambient cold air. This condition results in a considerable amount of moisture on the interior walls of the ventilator, which moisture is drawn by gravity back into the enclosure.

Another problem associated with prior art ventilator devices in addition to the fact that they are inclined to produce condensation involves the fact that they allow moisture in the ambient environment to enter the building. This phenomena is particularly prevalent during the evening hours when the roof structure cools. While water vapor which is present within an attic, for example, may well move outwardly during the daylight hours through the ventilator, it is often found that under cooler conditions, moisture is drawn back into the building through the same ventilator.

U.S. Pat. No. 4,984,947 issued to Patry October, 1976 discloses an example of a construction for preventing the backflow of moisture into a vented air. According to the patent, there is provided a flexible diaphragm which will deform under the influence of the air pressure experienced on its opposite sides. If the pressure within the building is higher than that outside, the diaphragm will flex and expose venting holes or openings through which the air can escape. On the other hand, if the pressure on the opposite side of the diaphragm is greater than that within the building, the diaphragm will close and there will be no passage for moisture to move inwardly pass the diaphragm into the building.

Another variety of roof ventilation devices are employed to provide rapid equalization of air pressure between the air within the roof and the ambient, exterior air pressure. In many roofing installations, a body of insulation is provided upon which there is loosely laid a membrane and upon this membrane a top roof layer is provided which may be of any suitable type. The loosely laid membrane is spot bonded to the body of insulation. In roofing installations of this type, negative air pressure sometimes occurs over the top of the roof. This negative air pressure is usually produced by a wind vortex resulting from the flow of air over various portions of the building. Ventilation devices are employed in roofing constructions of this type in order to allow air within the roof to escape quickly into the atmosphere when the exterior of the roof is subjected to substantial negative air pressures. Both U.S. Pat. No. 3,984,947 mentioned above and U.S. Pat. No. 4,223,486 issued to Kelly on Sept. 23, 1980, disclose roof ventilation devices of the type which provide pressure equalization within a roof.

U.S. Pat. No. 4,223,486 discloses a ventilator device in which a flexible, duckbill valve is disposed within a J shaped outer vent. The valve is mounted directly on the roof and extends substantially throughout the entire length of the outer vent housing. Consequently, this device is relatively expensive to manufacture because of the size and unique shape of the valve.

Another known ventilator device for pressure equalization employs a flexible, flat piece of rubber as a valve element. The flat rubber valve element is mounted on a metal strap which is secured to the bottom of an upstanding tube so that the valve element overlies the inlet opening at the base of the tube. This construction is also uneconomical from a manufacturing standpoint, and in some cases may not operate properly because the valve element is virtually in face-to-face abutting contact with the upper surface of the roof.

DISCLOSURE OF THE INVENTION

According to one aspect of the present invention a means is provided for insulating the interior of an air ventilator in a manner so as to reduce the possibility of condensation occurring on the interior of the ventilator. Means are also provided for permitting the movement of moisture laden air, in the form of water vapor, outwardly through the ventilator while at the same time preventing the movement of water in droplet form inwardly through the ventilator.

In accordance with another aspect of the present invention, an air ventilator is provided which allows for rapid pressure equalization between the area inside a roof and the exterior, ambient atmosphere. The device allows rapid exhaust of air within the roof in response to negative ambient air pressure but prevents air or other fluids such as rainwater from entering the roof through the vent.

A metal ventilator housing includes an annular base and a tubular air vent extending upwardly therefrom. The housing is of unitary construction and includes a cap covering the top of the tubular member and a series of ventilation holes beneath the cap through which air from an enclosure may escape into the surrounding environment. The housing is provided with an insert including a pair of tubular sleeves of insulative material between which there is sandwiched a valve member. In one embodiment, the valve member comprises a foraminous diaphragm or membrane of fabric-like material which allows the passage of moisture laden air in one direction theretrough but prevents the passage of moisture droplets in the opposite direction. The tubular sleeves may be substantially co-extensive with the housing so as to insulate essentially the entire length of the housing in order to prevent accumulation of condensation on the interior walls of such housing. The membrane is porous to moisture in the form of vapor but is impervious to water in the form of a liquid. The term "water vapor" as used herein is defined as individual molecules of water, while water in liquid form is defined as a multiplicity of individual water molecules having been bonded together to form a liquid.

In another embodiment, the valve comprises a flexible planar member which is sandwiched between tubular sleeves and deflects in response to a pressure differential within the vent to allow rapid passage of large volume of air from within the roof to the outside atmosphere.

According to still another aspect of the invention a novel method of manufacturing the ventilator described above is provided which includes the steps of forming a housing including a tubular portion, forming a pair of inserts, sandwiching a planar valve between the inserts and installing the inserts and valve in sandwiched relationship into the housing.

BRIEF DESCRIPTION OF THE DRAWINGS

In the drawings, wherein like components are designated by identical reference numerals in the various views:

FIG. 4 is a cross-sectional view of an alternate form of the ventilator device of the present invention;

FIG. 5 is a perspective, exploded view of the insert forming a part of the ventilator device shown in FIG. 4;

FIG. 6 is a fragmentary, cross-sectional view of the insert shown in FIG. 5 during fabrication thereof;

BEST MODE FOR CARRYING OUT THE INVENTION

Figure 1:
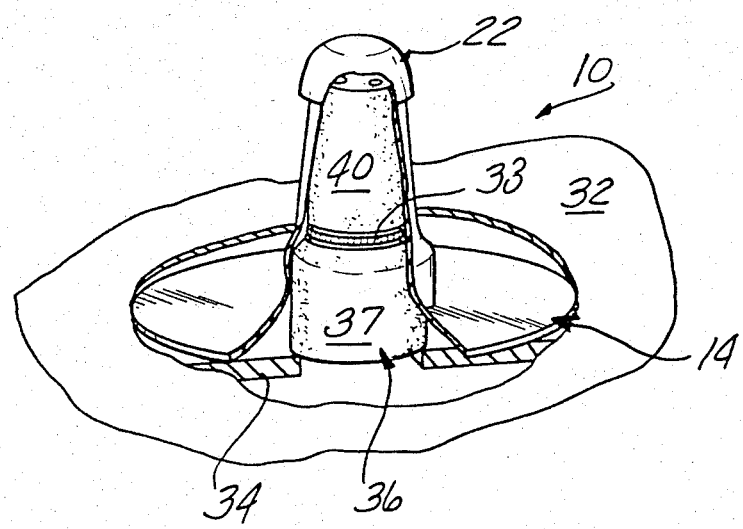
FIG. 1 is a fragmentary, perspective view of one form of the ventilator device of the present invention shown installed in a typical roof, parts being broken away in section for clarity.
Figure 2:
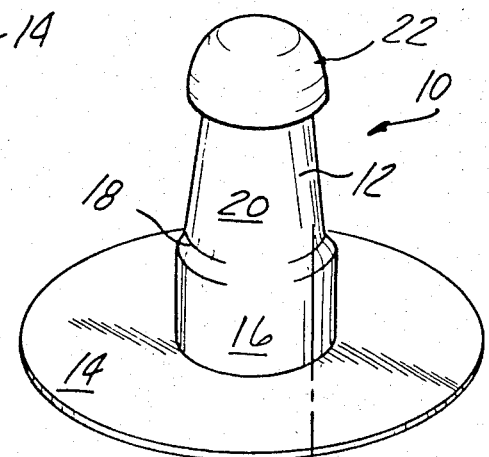
FIG. 2 is a perspective, exploded view of the device shown in FIG. 1.
Figure 3:
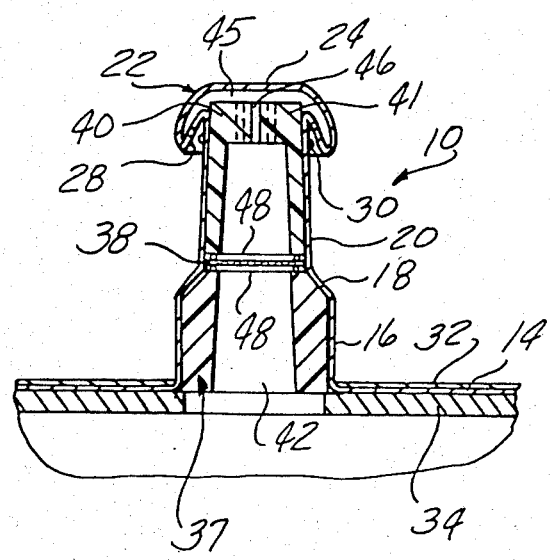
FIG. 3 is a cross-sectional view of the device shown in FIG. 1.

Referring first to FIGS. 1-3, the present invention broadly involves a ventilator device, generally indicated by the numeral 10, adapted to be installed in a roof 34 or the like of a building.

The device 10 includes a housing 12 of unitary construction, preferably meta such as aluminum. Housing 12 includes a substantially flat, annular base 14 formed integral with a tubular portion comprising a lower cylindrical portion 16 joined by an annular transition 18 to a truncated, fustro-conical upper portion 20. The housing 12 further includes a cap 22 comprising a topwall 24, a downwardly extending, arcuately shaped sidewall 26 and an inclined interior wall 28 provided with a plurality of ventilating apertures 30 therein. From the foregoing it may be appreciated that the housing 12 is essentially hollow thus allowing air within the building to pass therethrough and outwardly into the ambient environment through ventilating apertures 30. Housing 12 is adapted to be installed over an opening in roof 34 with roofing material 32 being applied over the annular base 14.

The device 10 further includes an insert generally indicated by the numeral 36 for controlling moisture passing through housing 12. Insert 36 comprises a body of insulative material, such a polystyrene, and includes a lower sleeve-like portion 37 and upper sleeve-like portion 40 between which there is sandwiched a circularly shaped, essentially flat diaphragm-like membrane 38, the details of which will be discussed hereinbelow. The lower portion 37 is essentially cylindrical and is provided with a beveled upper edge 52 adapted to conformingly engage transition 18 in housing 12. The outside diameter of lower portion 37 is essentially identical to the inside diameter of lower portion 16 of housing 12. Membrane 38 is adhesively attached to an annular upper surface 50 of lower portion 37 by means of any suitable adhesive such as a layer of wax 48. Similarly, a layer of wax 48 is applied to the bottom surface of upper portion 40 so as to bond upper and lower portions 37 and 40 as well as membrane 38 into a single assembly. Lower and upper portions 37 and 40 of insert 36 are provided with corresponding, centrally located passageways 42 and 44 respectively, so as to allow air within the building to pass through membrane 38. The upper end of upper portion 40 includes an essentially solid cap 41 provided with a plurality of longitudinally extending spaced passageways 46 which place passageway 44 in communication with a chamber 45 immediately beneath the top 24 of cap 22. The top of upper portion 40 extends upwardly coextensive with or slightly above the top of upper portion 20 of housing 12, into the chamber 45. Upper portion 45 of insert 36 is also fustro-conical shaped essentially identical to the interior wall of upper portion 40 of housing 12 so as to conformingly engage the interior sidewalls of upper portion 20.

The diaphragm like membrane 28 comprises a material which is pervious to water in the form of a vapor, i.e. individual molecules of water, but will not permit the passage of water as a liquid, i.e., water wherein hundreds of thousands of individual molecules bond together to form drops or larger units of water. One material suitable for use as the membrane 38 is available from W L Gore and Associates, Inc. of Elkton, Md. and is sold under the trademark "GORE-TEX". The GORE-TEX material has a fabric-like quality and is constructed of a tetrafluoroethylene polymer in a porous form which has an amorphous content exceeding about 5% and which has a microstructure characterized by nodes interconnected by fibrils and has a matrix tensile strength in at least one direction above 7300 psi. A material of the type described above is fully disclosed in U.S. Pat. Nos. 3,953,566 and 4,187,390 issued to Robert W. Gore, the entire disclosures of which patents are incorporated by reference herein.

Membrane 38 extends entirely across passageway 46 and the layer of wax 48 provides a water tight seal between membrane 38 and lower body portion 37.

A layer of hot wax or other suitable adhesive may be interposed between the sides of the insert 36 and interior sidewalls of housing 12 so as to retain the insert 36 therein.

In order to fabricate the insert 36, the upper and lower portions 40 and 37 respectively, may be formed as by molding, with the passageways 42, 44 or 46 being either molded or machined as desired. If desired, passageways 42 and 44 may be of equal diameter in which case upper and lower portions 40 and 37 may be molded simultaneously as a single member following which a transverse cut is made at surface 50 to separate the two portions. An adhesive seal material is then applied between surface 50 and membrane 38 following which a similar sealing and bonding material is applied between membrane 38 and the lower end of upper portion 40. The assembled insert 36 is then inserted through the open end of housing 12 and may be retained in press fit relationship therein; alternatively, a quantity of adhesive material may be introduced between the insert 36 and interior sidewalls of the housing 12.

Attention is now directed to FIGS. 4-6 wherein an alternate form of the ventilator device is depicted. In this embodiment of the invention, the housing 12 is essentially identical to that previously described, with the insert generally indicated by the numeral 57 being of somewhat different construction. Insert 57 is preferably formed as by molding from an insulative material such as styrofoam and is provided with slightly tapering exterior sidewalls defining a mildly frustro-conical configuration, the lower portion of the exterior sidewall of insert 57 engaging the bottom of cylindrical portion 16 of housing 12 while upper portions of the exterior sidewalls of insert 57 are somewhat radially spaced inwardly from upper portions of the cylindrical portions 16 of housing 12.

Insert 57 is provided with a longitudinally extending frustro-conically shaped passageway 56 therein.

A circularly shaped, flat membrane 58 formed from material essentially identical to that previously described with reference to membrane 38 is adapted to overlie the upper end of passageway 56 and has the periphery thereof extending downwardly over the sides of body 54. A bead 64 of adhesive, sealing material such as wax is applied to the upper end of body 54 so as to seal and retain membrane 58 on body 54. A tight seal is created between the upper interior space of housing 12 and insert 57 by virtue of an annular, arcuately shaped shoulder 62 on body 54 which biases the periphery of membrane 58 into sealing, retaining relationship to the annular transition 18.

The ventilation device shown in FIGS. 4-6 is manufactured by first forming the housing 12 as disclosed in U.S. Pat. No. 4,370,876. The insert 57 is then formed by molding or machining body 54 and forming the passageway 56 therein. A bead 64 of wax or the like is then applied along the top surface of body 54 following which membrane 58 is juxtaposed over the top of body 54. Body 54, with the membrane 58 having been secured thereto is then inserted into the open end of housing 12 until the shoulder 62 engages annular transition 18. The insert 56 may be held in press-fit relationship within the housing 12, or, alternatively, adhesive may be introduced between insert 57 and the lower portion 16 of housing 12.

In use, the insert 36 and 57 prevent the accumulation of moisture within the housing 12 while allowing moisture laden air to pass through membranes 38 and 58 and out of the housing 12 via apertures 30. Additionally, membranes 38 and 58 prevent moisture in the form of droplets or larger units from passing downwardly back into the building. In the case of the embodiment of the invention shown in FIGS. 1-3, it may be appreciated that the insulative material of the insert 36 insulates essentially the entire surface area of the upper and lower portions 20 and 16 respectively of housing 12, thereby preventing moisture from accumulating on the interior walls of the housing 12. Additionally, by virtue of the fact that the top of the end cap 41 extends up to or beyond the upper end of upper portion 12, and into chamber 45, moisture laden air escaping from the building is prevented from coming into contact with the upwardly projecting sides of housing 12, and such air does not contact the housing until it enters chamber 45. Upon entering chamber 45, any condensation which may accumulate on the interior of the housing flows down the sidewalls 26 of the cap 22 and out of the device 10 through apertures 30. Moreover, water droplets accumulating on the bottom surface of cap 24 are prevented from readily re-entering the insert 36 by virtue of the fact that the top of end cap 41 is not essentially completely open, but rather is only provided with a limited number of passageways 46; consequently water droplets falling from cap 24 onto the upper face of end cap 41 tends to roll off the insert 36 and are drained out through apertures 30.

Figure 7:
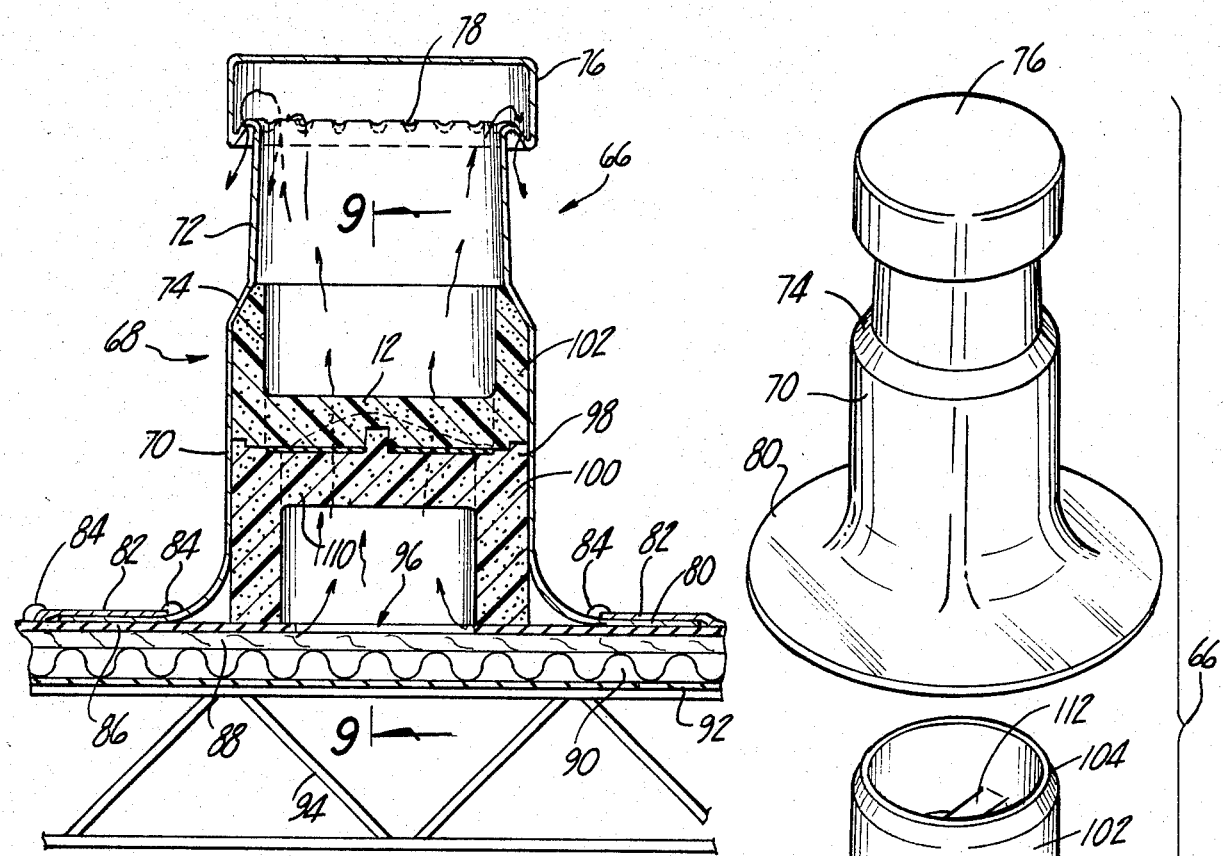
FIG. 7 is a cross-sectional view of another form of the ventilator device of the present invention shown installed on a flat roof.
Figure 8:
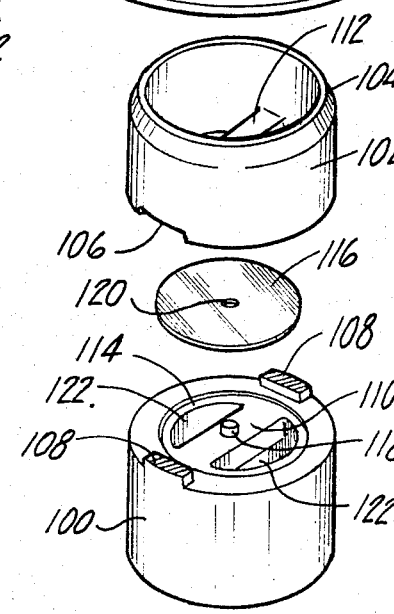
FIG. 8 is an exploded perspective view of the ventilator device shown in FIG. 7; and, FIG. 9 is a sectional view taken along line 9—9 in FIG. 7.
Figure 9:
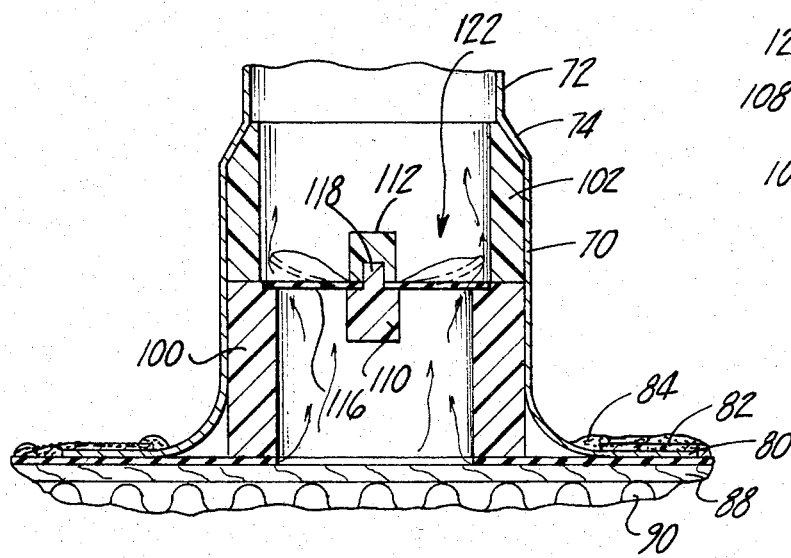

Attention is now directed to FIGS. 7-9 wherein another alternate form of the ventilator of the present invention is depicted. The ventilator 66 includes a tubular housing 68 constructed of metal or the like as by the manufacturing method previously described herein above. The tubular housing 68 includes a lower cylindrically shaped portion 70 having an outwardly turned, horizontally extending flange 80 which defines the base of the ventilator 66. An upper cylindrically portion 72 of the ventilator 66 possesses a diameter less than that of the lower portion 70 and is connected with the lower portion 70 by an angular transition which forms a shoulder 74 on the interior surface of the housing 68.

The upper portion 72 of the tubelike housing includes a plurality of circumferentially spaced air outlets 78 and is integrally connected with a cap 76 which covers the outlet openings 78 from rain or the like but yet allows escape of air through the outlet opening 78 into the surrounding environment. The various portions of the ventilator 66 described above are preferably formed integral with each other from a single sheet of metal, or plastic, however it is to be recognized that these components may be formed individually and joined together using known techniques.

The ventilator device 66 is adapted to be installed on top of a roof, a typical construction for which will now be described. The roof is supported by a truss-like, metal or steel joist and/or deck 94 upon which there is laid a vapor barrier 92. Vapor barrier 92 may comprises polyethylene or the like. A thickness of conventional insulation 90 is disposed over barrier 92. A layer of rigid material such a fiberboard 88 is placed on top of the insulation 90. A rubber roofing membrane is secured, as with adhesives to the upper surface of the fiberboard 88. Rubber membrane 86 may be similar to that produced by Kelly Energy Systems, which is 55 mils thick and is identified by the manufacturers registered trademark WHALESKIN/81. If desired, gravel (not shown) or the like may be applied on top of the rubber membrane 86 to assure that it is held in place.

The membrane 86 is essentially air tight but is readily flexible. Accordingly, in the event that a substantial negative pressure is applied outside the roof, the resulting pressure differential may tear the rubber membrane away from the hardboard 88, thus resulting in ballooning or possible rupture of the membrane 86 unless the ventilator 66 is employed to equalize the air pressure.

The ventilator device 66 is installed on the roof by cutting an opening 96, which is preferably circular, in the membrane 86. The inlet opening in the bottom of the ventilator device 66 is disposed in registration over opening 96 in membrane 86. An angularly shaped, flexible seal 82 of any suitable material overlaps the juncture between the top surface of the membrane 86 and the flange 80. The seal 82 may be secured in place using known adhesives and a bead 84 of caulking or other suitable sealant applied around the edges of the seal to assure an air and water tight seal between the flange 80 and the membrane 86.

A one-way valve, the details of which will be discussed below, is installed intermediate the upper and lower ends of the tubular housing 68 by means of a body or insert which includes a lower portion 100 and upper portion 102. Insert portions 100, 102 are sleeve like in construction and include substantially cylindrical inner and outer surfaces. Insert portions 100,102 are preferably formed as by molding and/or machining a thermally insulating material such as polystyrene or polyurethane foam. The outer cylindrical surfaces of insert portions 100,102 are closely received within and may flushly abut the interior cylindrical surface of the lower portion 70 of the housing 68. The upper insert portion 102 includes a beveled surface 104 which is adapted to flushly engage the shoulder 74 of housing 68 thereby limiting the depth of the penetration of the insert into the housing 68. Insert portions 100, 102 are joined together in end-to-end relationship by means of glue, hot wax or the like; a pair of upstanding lands 108 on the lower insert portion 100 are received within corresponding notches 106 in the upper insert portion 102 in order to provide registration between the insert portions and prevent rotation thereof relative to each other. The assembled insert formed by portions 100,102 is held in place within the lower portion 70 of the housing 68 by means of hot wax or glue applied between the insert and the housing 68.

Insert portions 100, 102 are each provided with a tranversely extending support strut 110, 112 which divide the longitudinal passageway through the insert into a pair of semi-circular valve openings 122 on each side of support struts 110, 112. Support struts 110, 112 possess opposing flat faces which extend parallel to and are closely spaced from each other a prescribed distance. A circularly shaped, planar valve member 116 possesses a diameter slightly larger than that of the lower insert portion 100 and is held in compressed, sandwiched relationship between the opposing faces of support struts 110 and 112. Valve 116 may comprise any suitable material, such as the WHALESKIN/81 previously mentioned, which is resilient and readily flexible. An upstanding projection 118 on support strut 110 extends through a central aperture 120 in valve member 116, and into a corresponding opening in support strut 112. Projection 118 maintains the valve member 116 in proper registration within a depression in one end of insert portion 100 which is defined by the upper face of support strut 112 and an annular shoulder 114 which surrounds, and is flush with the upper face of support strut 110. The annular shoulder 114 effectively provides a seat against which the outer periphery of the valve 116 rests to close the valve openings 122 and prevent fluids from traveling downwardly through the housing 68 into the roof.

As best seen in FIGS. 7 and 9, the assembled insert is received within the lower portion 70 of housing 68, with the lower insert portion 100 extending downwardly into abuttment with the membrane 86 surrounding the opening 96.

In operation, the ventilator device 66 relieves positive pressure within the roof building from negative ambient pressure outside the roof or otherwise, in the following manner. Air flows from the roof upwardly through the opening 96 toward the valve openings 122. Although a portion of the valve member 116 is stationarily held across its diameter by the support struts 110, 112, those portions of the valve 116 overlying valve openings 122 flex upwardly, as shown in FIG. 9, thereby allowing the release of air through valve openings 122. Air flowing through valve openings 122 flow upwardly toward the cap 76 and out of the tubular housing 68 through vent holes 78. After pressure equalization has been achieved, the valve member 116 deflects back to its normal flap position overlying the shoulder 114 so as to close the valve openings 122 and prevent air or other fluid entering the upper portion of the housing 72 to gain access to the roof through opening 96.

The invention provides a novel method of fabricating the ventilation device described hereinabove which comprises the steps of forming the tubular housing 68; forming a first insert portion 102; forming a second insert portion 100, the first and second insert portions 100, 102 including a passageway 122 through which air may flow; forming a substantially flat valve member 116 configured to cover the passageway 122; interposing the valve member 116 in sandwiched relationship between the first and second insert portions 100, 102; and inserting the first and second insert portions 100, 102 and the valve member 116 in sandwiched relationship into the tubular housing 68.

From the foregoing, it is apparent that the ventilator device and method of constructing the same described above not only provide for the reliable accomplishment of the objects of the invention but do so in a particularly effective and economical manner. It is recognized, of course, that those skilled in the art may make various modifications or additions to the preferred embodiment chosen to illustrate the invention without departing from the spirit and scope of the present contribution of the art. Accordingly, it is to be understood that the protection sought and to be afforded hereby should be deemed to extend to the subject matter claimed and all equivalents thereof fairly within the scope of the invention.

I claim:

1. A roof ventilation device, comprising:
an elongate hollow tube member having openings in opposite ends thereof, said tube including a longitudinal passageway communicatively connecting said openings and through which air may flow;
a substantially planar valve member extending transversely across said passageway for controlling the flow of fluid through said passageway; and
means within said tube member for mounting said valve member within said passageway intermediate said openings,
said mounting means including a cylindrical sleeve of synthetic foam material disposed within and secured to said tube member, said sleeve having an outside cylindrical wall conformally engaging the inside wall of said tube member to prevent fluid flow therebetween, said sleeve having an inside cylindrical wall defining a portion of the flow path of fluid through said tube member,
said mounting means further including an elongate strut formed integral with said inside cylindrical wall and extending transversely across said flow path, and means for securing said valve member on said strut.

2. The roof ventilation device of claim 1, including a cap covering one of said openings from the ambient environment but allowing air to flow through said one opening.

3. The roof ventilation device of claim 2, wherein said tube member is generally cylindrical and said cap is formed integral with one end of said tube member.

4. The roof ventilation device of claim 1, wherein:
said tube member includes two adjacent sections having differing diameters and a radially extending, annular shoulder within said passageway, said shoulder being defined between said adjacent sections of said tube member, and
said sleeve engages said shoulder.

5. The roof ventilation device of claim 4, wherein one end of said tube member is substantially cylindrical, said sleeve being disposed within and coextensive with said one end of said tube member.

6. The roof ventilation device of claim 5, wherein said one end of said tube member includes a substantially cylindrical sidewall and an outwardly extending annular flange.

7. The roof ventilation device of claim 1, wherein said sleeve includes first and second mating portions, said valve member being mounted between said first and second portions.

8. The roof ventilation device of claim 7, wherein said strut includes first and second opposing halves respectively integrally formed with said first and second portions of said sleeve, said valve being disposed in sandwiched engagement between said halves of said strut.

9. The roof ventilation device of claim 8, wherein said valve includes a central aperture therein, one of said strut halves includes a central cavity therein and the other of said strut halves includes a projection extending through said aperture and into said cavity whereby to prevent lateral movement of said valve relative to said strut.

10. The roof ventilation device of claim 8, wherein said valve member includes at least a portion which is pivotable about an axis extending perpendicular to the longitudinal axis of said passageway.

11. The roof ventilation device of claim 7, wherein said mounting means includes means for interconnecting said first and second portions and for preventing rotation of one of said portions relative to the other of said portions.

12. The roof ventilation device of claim 1, wherein said sleeve is structurally self supporting.

13. A device for relieving positive air pressure within a roof of the type including a flexible, substantially air tight outer membrane, comprising:
an upstanding, essentially hollow housing having an upper end spaced above said roof and a lower end secured to said roof, said upper end including an outlet opening through which air may escape from said housing into the surrounding atmosphere, said lower end including an inlet opening adapted to overlie an opening in said membrane whereby air under positive pressure within said roof may pass into said housing through said lower opening;
a one way flap valve within said housing and shiftable from an open position for allowing air within said roof under positive pressure to flow upwardly through said housing to a closed position for preventing air flow downwardly through said housing into said roof; and,
means for mounting said flap valve within said housing in spaced relationship to said inlet and outlet openings,
said mounting means including a cylindrical insert receivable within one end of said housing and having a longitudinal air passage therethrough, said insert being mounted within said housing and tightly engaging the entire inside perimeter of said housing, whereby all the air passing through said housing flows through said air passage in said insert, said insert including first and second mating sections of structurally self-supporting foam material, said insert including a strut extending transversely across said air passage, said strut being defined by first and second portions disposed in face-to-face relationship to each other and respectively formed integral with said first and second insert sections, said flap valve being sandwiched between said first and second strut portions.

14. The device of claim 13, wherein said first and second insert sections are each cylindrical and are connected in end-to-end relationship to each other.

15. The device of claim 14, wherein said insert includes an annular valve seat, and said flap valve includes a planar member of flexible material, at least portions of said planar member normally being seated on said valve seat when said valve is in said closed position but flexing upwardly away from said valve seat in response to positive air pressure within said roof whereby to open said valve.

16. The device of claim 13, wherein said housing includes first and second adjacent sections of differing diameters, the diameter of said first housing section being greater than the diameter of said second housing section, said housing further including an annular, outwardly extending shoulder between said first and second housing sections, said insert being dispoed within said first housing section and abutting said shoulder.

17. A device for relieving positive air pressure within a roof comprising:
   an upstanding, generally cylindrical tube having an upper end spaced above said roof and a lower end adapted to be secured to said roof, said upper end including an outlet through which air may escape from said tube into the ambient environment, said lower end including an inlet adapted to overlie an opening in said roof through which air under positive pressure may enter said inlet; and
   flow control means within said tube for controlling the flow of air through said tube, said flow control means including
   (1) a flexible valve member,
   (2) means for mounting said flexible valve member for flexing movement between an open position allowing air to flow from said inlet through said tube to said outlet, and a closed position preventing flow of fluid from said outlet through said tube to said inlet and into said roof, said mounting means including a sleeve received within and secured to said tube, said sleeve including first and second portions disposed in end-to-end, abutting relationship to each other, said valve member being sandwiched between said first and second sleeve portions.

18. The device of claim 17, wherein said first and second portions include means extending between said first and second portions for preventing rotation of said first and second portions relative to each other.

19. The device of claim 17, wherein said sleeve includes a shoulder upon which at least a portion of the periphery of said flexible valve member is seated when said valve is in said closed position.

20. The device of claim 17, wherein said tube includes a circumferential shoulder on the inner surface thereof and one end of said sleeve abutts said shoulder, whereby to limit the penetration of said sleeve into said tube.

21. The device of claim 20, wherein said tube includes a first section adjacent the bottom of said tube and a second section above and adjacent to said first section, said first section having a cross section greater in magnitude than the cross section of said second section, said shoulder being defined between said first and second sections.

22. The device of claim 17, including a cap on said tube covering said outlet but allowing air to escape through said outlet.

23. The device of claim 17, wherein said sleeve comprises synthetic, structurally self supporting foam material.

24. A method of fabricating a roof ventilation device, comprising the steps of:
   (a) forming a tubular housing through which air may flow;
   (b) forming a first insert portion;
   (c) forming a second insert portion, said first and second insert portions having a passageway through which air may flow;
   (d) forming a substantially flat valve member configured to cover said passageway;
   (e) interposing said valve member in sandwiched relationship between said first and second insert portions; and,
   (f) inserting said first and second insert portions and said valve member in sandwiched relationship into said tubular housing.

* * * * *